United States Patent
Kim et al.

(10) Patent No.: US 8,046,502 B2
(45) Date of Patent: *Oct. 25, 2011

(54) DEVICE OF IDENTIFYING HOST PROTOCOL AND SMART CARD INCLUDING THE SAME

(75) Inventors: Seong-Hyun Kim, Yongin-si (KR);
Sang-Bum Kim, Suwon-si (KR);
Joong-Chul Yoon, Seoul (KR);
Sang-Wook Kang, Seoul (KR);
Jong-Sang Choi, Seongnam-si (KR);
Sung-Hyun Kim, Anyang-si (KR);
Chul-Joon Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/175,155

(22) Filed: Jul. 17, 2008

(65) Prior Publication Data
US 2008/0276015 A1    Nov. 6, 2008

Related U.S. Application Data

(63) Continuation of application No. 11/880,241, filed on Jul. 20, 2007, now Pat. No. 7,805,544.

(30) Foreign Application Priority Data

Jul. 21, 2006  (KR) .......................... 10-2006-0068622

(51) Int. Cl.
*G06F 3/00* (2006.01)
*G06F 13/42* (2006.01)

(52) U.S. Cl. .................. 710/11; 710/8; 710/14; 710/16; 710/105; 709/237

(58) Field of Classification Search .................... None
See application file for complete search history.

(56) References Cited

U.S. PATENT DOCUMENTS

| 6,883,715 B1* | 4/2005 | Fruhauf et al. ................ 235/492 |
| 2001/0027032 A1 | 10/2001 | Inomata et al. |
| 2005/0005045 A1* | 1/2005 | Kim et al. ....................... 710/74 |
| 2006/0000917 A1* | 1/2006 | Kim et al. ..................... 235/492 |
| 2007/0210174 A1* | 9/2007 | Deprun et al. ................ 235/492 |

FOREIGN PATENT DOCUMENTS

| JP | 2000-285065 A | 10/2000 |
| JP | 2001-319209 A | 11/2001 |
| KR | 2002-0069848 A | 9/2002 |
| KR | 1020050003960 A | 1/2005 |

* cited by examiner

*Primary Examiner* — Eron J Sorrell
*Assistant Examiner* — Dean Phan
(74) *Attorney, Agent, or Firm* — Onello & Mello, LLP

(57) ABSTRACT

The present invention provides an integrated circuit chip which includes a processor; a contact pad unit connected to a host through a plurality of contact pads; a host interface detector including at least one pull-up resistor and one pull-down resistor, for selectively connecting the pull-up resistor and the pull-down resistor to the contact pad unit to detect a host interface status; and an interface unit including a plurality of interface protocols, for communicating with the host using a part or all of the plurality of contact pads, wherein the processor receives a status of the host from the host interface detector, identifies a protocol of the host based on the received status of the host, and controls the interface unit so as to enable an interface protocol that is used to communicate with the host.

13 Claims, 10 Drawing Sheets

Fig. 4

| Contact Pin | | C1 | C2 | C3 | C4 | C5 | C6 | C7 | C8 |
|---|---|---|---|---|---|---|---|---|---|
| ISO Connected | | VDD | Reset | Clock | | GND | | SIO | |
| | Host PIN Status | | | | | | | | |
| MMC Connected | | VDD | | | MData0 | GND | MClk | | D+ |
| | Host PIN Status | | | | Pull-up (50K~100K) | | | | Pull-up (50K~100K) |
| USB Connected | | VDD | | | D+ | GND | | | D- |
| | Host PIN Status | | | | Pull-Down (15K) | | | | Pull-Down (15K) |

Fig. 10

| MFP Setting | | The result of reading operation at the contact pads C4/C8 through MFP | HOST Protocol |
|---|---|---|---|
| The switch having a pull-up resistor with 1KΩ | The switch having a pull-down resistor with 10KΩ | | |
| ON | ON | High | Undefined |
| ON | OFF | Low | Undefined |
| ON | ON | High | USB Protocol |
| ON | OFF | Low | Undefined |
| OFF | ON | High | Undefined |
| OFF | OFF | Low | MMC Protocol |
| OFF | ON | High | Undefined |
| OFF | OFF | Low | Undefined |

DEVICE OF IDENTIFYING HOST PROTOCOL AND SMART CARD INCLUDING THE SAME

CROSS-REFERENCE TO RELATED APPLICATIONS

This application is a continuation of U.S. application Ser. No. 11/880,241, filed on Jul. 20, 2007, which relies for priority upon Korean Patent Application No. 10-2006-0068622, filed on Jul. 21, 2006, the entire contents of which are hereby incorporated by reference.

FIELD OF THE INVENTION

The present invention disclosed herein relates to a memory card, and more particularly, to an integrated circuit (IC) card.

BACKGROUND OF THE INVENTION

In case of a mobile product, an IC card uses a variety of protocols. The protocols include USB (Universal Serial Bus), IC-USB (Inter-Chip Universal Serial Bus), MMC (Multi-Media Card), ISO 7816 and so on.

The USB is a protocol implemented by INTEL, COMPAQ, IBM, DEC, Microsoft, NEC, and Northern Telecom to interface with PC peripherals. The IC-USB protocol is a new protocol established to facilitate communication between chips, and uses a conventional USB protocol. The MMC is a flash memory card, such as those used in a mobile digital device, and uses an MMC protocol. The ISO 7816 (International Organization for Standardization 7816) is a protocol of a contact-type IC card governed by the ISO.

Because IC cards generally support one protocol, they do not support a host using another protocol. This creates communication limitations with respect to the IC cards and the host.

SUMMARY OF THE INVENTION

In accordance with one aspect of the present invention, provided is an integrated circuit chip which includes a processor; a contact pad unit connected to a host through a plurality of contact pads; a host interface detector including at least one pull-up resistor and at least one pull-down resistor, the host interface detector configured to selectively connect the at least one pull-up resistor and the at least one pull-down resistor to the contact pad unit to detect a host interface status; and an interface unit including logic configured to implement a plurality of interface protocols, each interface protocol for communicating with the host using one or more of the plurality of contact pads, wherein the processor is configured to receive a status signal of the host from the host interface detector, to identify a protocol of the host based on the received status signal of the host, and to control the interface unit to enable an interface protocol to be used to communicate with the host.

The host interface unit can be configured to acknowledge the status of the host as one of a high state wherein at least one contact pad from the plurality of contact pads is connected to the at least one pull-up resistor, a low state wherein the at least one contact pad is connected to the at least one pull-down resistor, a high state wherein the at least one contact pad is connected to a power supply voltage, a low state wherein the at least one contact pad is connected to a ground voltage, a floating state, and a clocking state, and to identify the host protocol based on the acknowledged state.

The processor can be configured to determine a resistance value range of the at least one pull-up resistor or the at least one pull-down resistor when a contact pad of the host is connected to the at least one pull-up resistor or the at least one pull-down resistor.

The integrated circuit card can further comprise a power detector configured to estimate a voltage level of the host.

The interface unit can include logic for a MMC protocol, an USB 2.0 protocol, an IC-USB protocol, and an ISO 7816 protocol.

The host interface detector can include switches connected between one or more of the pull-up resistors and contact pads from the plurality of contact pads and between one or more of the pull-down resistors and one or more other contact pads from the plurality of the contact pads, the host interface detector configured to simultaneously select one or more of the switches to detect the interface status of the host.

The switches can be controlled so as to be turned on or off sequentially or simultaneously.

The contact pad unit can include a set of contact pads C1, C2, C3, C4, C5, C6, C7 and C8.

The contact pad C1 can be connected to VDD and the contact pad C5 can be connected to VSS.

The contact pads C1 and C5 can be commonly used for the plurality of interface protocols.

The contact pads C2, C3 and C7 can be used for an ISO 7816 protocol.

The contact pads C4, C6 and C8 can be used for an MMC protocol.

Two of the contact pads C4, C6 and C8 can be used for an USB 2.0 protocol.

Two of the contact pads C4, C6 and C8 can be used for an IC-USB protocol.

In accordance with another aspect of the present invention, provided is an integrated circuit card comprising: a processor; a contact pad unit connected to a host through a plurality of contact pads; a host interface detector including at least one pull-up resistor and at least one pull-down resistor, the host interface detector configured to selectively connect the at least one pull-up resistor and the at least one pull-down resistor to the contact pad unit to detect a host interface status; and an interface unit including logic configured to implement a plurality of interface protocols, each interface protocol for communicating with the host using one or more of the plurality of contact pads, the plurality of protocols including an ISO 7816 protocol, an MMC protocol, an USB 2.0 protocol, and an IC-USB protocol, wherein the processor is configured to receive a status signal of the host from the host interface detector, to identify a protocol of the host based on the received status signal of the host, and to control the interface unit to enable one of the plurality of interface protocols to be used to communicate with the host.

The host interface unit can be configured to acknowledge the status of the host as one of a high state wherein at least one contact pad from the plurality of contact pads is connected to the at least one pull-up resistor, a low state wherein the at least one contact pad is connected to the at least one pull-down resistor, a high state wherein the at least one contact pad is connected to a power supply voltage, a low state wherein the at least one contact pad is connected to a ground voltage, a floating state, and a clocking state, and to identify the host protocol based on the acknowledged state.

The contact pad unit can include a set of contact pads C1, C2, C3, C4, C5, C6, C7 and C8.

In accordance with another aspect of the present invention, provided is an integrated circuit card comprising: a processor; a contact pad unit connected to a host through a plurality of contact pads; a host interface detector including at least one pull-up resistor and at least one pull-down resistor, the host interface detector configured to selectively connect the at least one pull-up resistor and the at least one pull-down resistor to the contact pad unit to detect a host interface status, wherein the host interface detector includes switches connected between one or more of the pull-up resistors and contact pads from the plurality of contact pads and between one or more of the pull-down resistors and one or more other contact pads from the plurality of the contact pads, the host interface detector configured to simultaneously select one or more of the switches to detect the interface status of the host; and an interface unit including logic configured to implement a plurality of interface protocols, each interface protocol for communicating with the host using one or more of the plurality of contact pads, wherein the processor is configured to receive a status signal of the host from the host interface detector, to identify a protocol of the host based on the received status signal of the host, and to control the interface unit to enable an interface protocol to be used to communicate with the host.

The interface unit can include logic for a MMC protocol, an USB 2.0 protocol, an IC-USB protocol, and an ISO 7816 protocol.

BRIEF DESCRIPTION OF THE FIGURES

The above and other features and advantages of the present invention will become more apparent by describing in detail exemplary embodiments thereof with reference to the attached drawings, in which like reference numerals refer to the same or similar elements. In the drawings:

FIG. 4 is a table showing each pad and signal illustrated in FIG. 3.

FIG. 10 shows a table used to identify a protocol of a host using the host interface detector circuits illustrated in FIGS. 5 to 9.

DETAILED DESCRIPTION OF PREFERRED EMBODIMENTS

Preferred embodiments of the present invention will be described below in detail with reference to the accompanying drawings. The present invention can, however, be embodied in different forms and should not be constructed as limited to the embodiments set forth herein.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Hereinafter, it will be described about an exemplary embodiment of the present invention in conjunction with the accompanying drawings.

The protocol of a cellular phone fundamentally uses the ISO protocol. But the protocol of a cellular phone uses the MMC protocol or the USB protocol as a secondary protocol in order to use a faster protocol than the ISO protocol.

Figure 1:
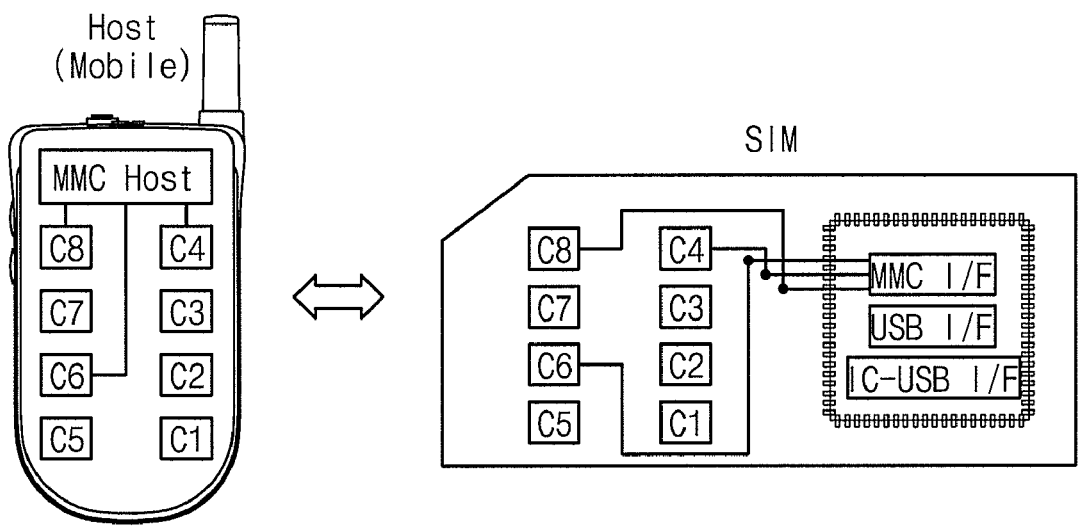
FIG. 1 shows a host communicating with an IC card using the MMC protocol.
Figure 2:
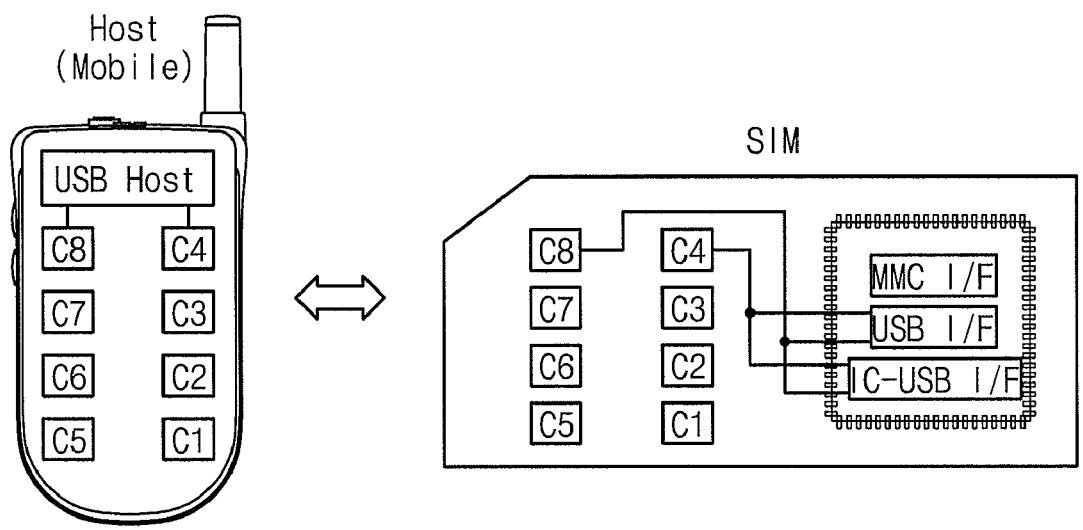
FIG. 2 shows a host communicating with an IC card using the USB protocol.

FIG. 1 shows a host, e.g., a cellular phone, communicating with an IC card using the MMC protocol. FIG. 2 shows a host communicating with an IC card using the USB protocol.

Referring to FIGS. 1 and 2, IC cards communicate with a cellular phone (namely, Host) using three contact pads that are not used at the ISO protocol.

In case of using the ISO 7816 protocol, the MMC protocol and the USB protocol, IC cards can commonly use contact pads C1 and C5. If using the MMC protocol, IC cards can use contact pads C4, C6 and C8. If using the USB protocol, IC cards can use contact pads C4 and C8.

Figure 3:
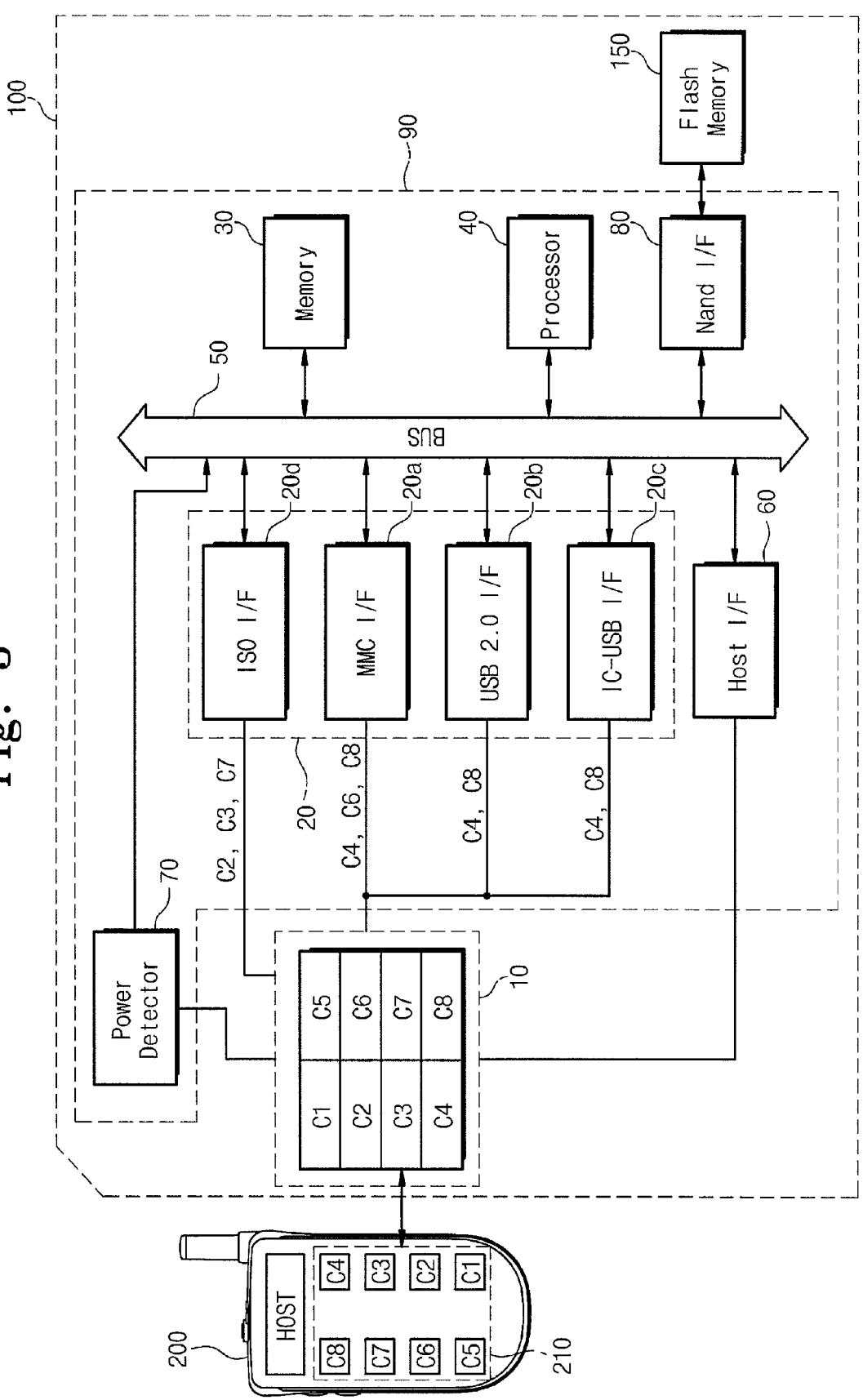
FIG. 3 is a block diagram showing an embodiment of an IC card according to aspects the present invention.

FIG. 3 is a block diagram of an embodiment of an IC card in accordance with aspects of the present invention. The present invention is related to IC cards 100 configured to identify the protocol of a host.

Referring the FIG. 3, the host 200 includes contact pads 210, denoted as contact pads C1-C8. The IC card 100 includes a contact pad device 10, a controller 90, and a flash memory 150. The controller 90 includes an interface device 20, a memory 30, a processor 40, a bus 50, a host interface detector 60, a power detector 70, and a NAND interface 80. The contact pad device 10 includes 8 contact pads configured to use the ISO 7816 protocol. The interface device 20 includes an MMC interface block 20*a* supporting the MMC protocol, an USB 2.0 interface block 20*b* supporting the USB 2.0 protocol, an IC-USB interface block 20*c* supporting the IC-USB protocol, and an ISO 7816 interface block 20*d* supporting the SIM protocol.

The memory 30 includes a boot code and other program codes. The boot code is an instruction set needed for initializing a system. The other program codes are instruction sets supporting various functions of the card.

The IC card 100 can be a SIM (Subscriber Identity Module) card that is used in an asynchronous cellular phone. The SIM card stores a characteristic number, an account number, a registered phone number, message, and the like.

If the system is powered on or at a reset state, the processor 40 accesses the bus 50 using the boot code and the other program code stored in the memory 30. The processor 40 initializes the IC card 100 using the boot code and the other program code.

The processor 40 identifies the protocol of the host 200 using the host interface detector 60. The bus 50 interconnects with the interface device 20, the memory 30, the processor 40, and the host interface detector 60. In response to a control of the processor 40, the host interface detector 60 detects the status of the host 200 through the contact pad device 10. The power detector 70 detects a voltage level of a power inputted from the host 200. The controller 90 accesses the flash memory 150 through the NAND interface 80.

FIG. 4 is a table showing each pad and signal illustrated in FIG. 3. The present invention supports various protocols by sharing the contact pads.

In this embodiment, if the SIM protocol is used by the host, then the ISO 7816 protocol is used by the IC card. In case of the ISO 7816 protocol, the contact pad C1 is connected with the VDD, the contact pad C2 with the reset signal, the contact pad C3 with the clock, the contact pad C5 with the GND, and the contact pad C7 with the data input/output. The contact pads C4, C6, and C8 are not used in the ISO 7816 protocol.

Referring the FIG. 4, the contact pads C1 and C5 are connected to the power detector 70, and are used to identify a USB protocol and an IC-USB protocol. The IC card 100 supports the MMC protocol, the USB 2.0 protocol, and the IC-USB protocol using the contact pads C4, C6 and C8, which are not used for the ISO 7816, in the present embodiment. If the host 200 uses the MMC protocol, the contact pads C4 and C8 are connected with a pull-up resistor with about 50-100KΩ). If the host 200 uses the USB protocol, the contact pads C4 and C8 are connected with a pull-down resistor with about 15KΩ.

The host interface detector 60 includes a Multi Function Port having at least one or more pull-up resistors and at least one or more pull-down resistors. The Multi Function Port, the so-called MFP, can identify 5 states, such as: a signal with VDD, a pull-up resistor with VDD, floating, a pull-down resistor with VSS, and VSS.

Also, the Multi Function Port can identify whether the contact pads of the host 200 have a pull-up resistor or a pull-down resistor, how much the resistance value of a pull-up resistor or a pull-down resistor is, how high the voltage level of the host 200 is, and how many times the signal of the host 200 changes (namely, whether the signal of host 200 is at a clocking state).

A VDD indicates a power voltage applied to the IC card 100, and a floating state indicates that no signal voltage is applied to the IC card 100 (namely, neither VDD nor VSS). A pull-up resistor is equipped to raise the voltage level for a stable high state. A pull-down resistor is equipped to lower the voltage level for a stable low state.

FIGS. 5 to 9 show embodiments of the host interface detector according to aspects of the present invention.

Figure 5:
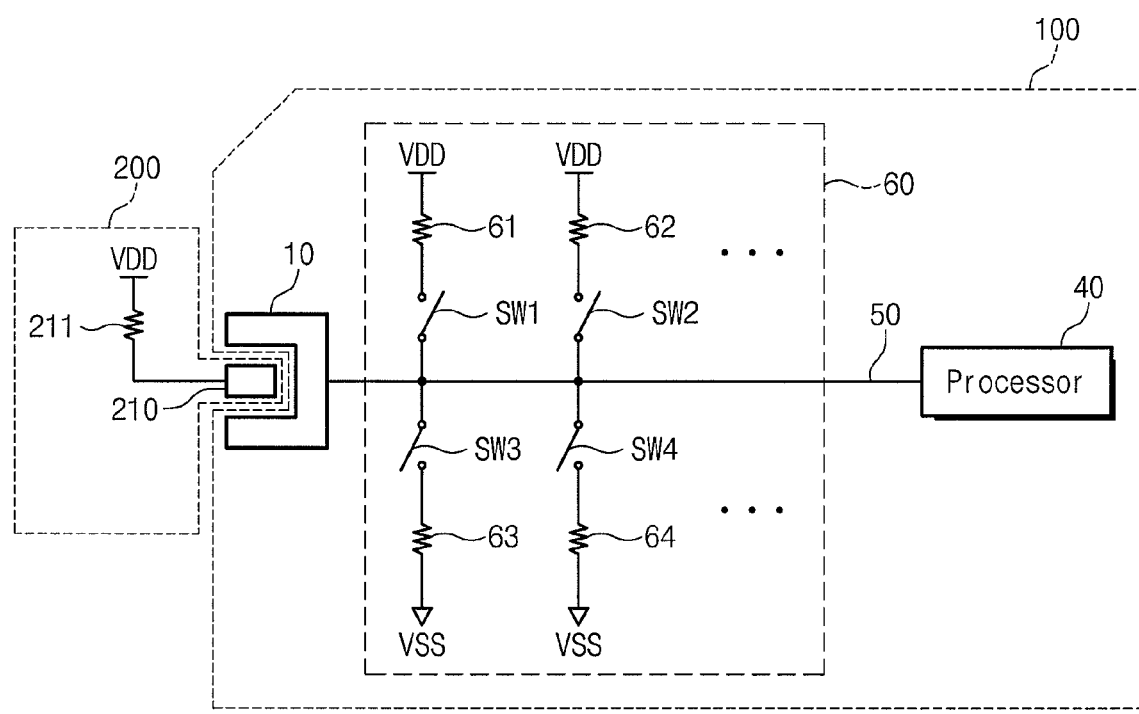
FIGS. 5 to 9 show embodiments of a host interface detector according to aspects of the present invention.

Referring to FIG. 5, the contact pad device 10 is connected to the host interface detector 60, as in FIG. 3. The Multi Function Port includes various resistors 61-64 to identify the host protocol. When the contact pads 210 provides inputs to the host interface detector 60 through the contact pad device 10, the processor 40 transfers the status of host to the processor 40 with toggling switches SW1 to SW4.

If a voltage of the signal transferred to the processor 40 is higher than a critical voltage (for instance, the critical voltage could be 0.3*VDD), the transferred signal is judged to be at a high state. If a voltage of the signal transferred to the processor 40 is lower than a critical voltage, the transferred signal is judged to be at a low state.

If the contact pad of the host 200 is connected to VDD with a pull-up resistor 211, and if the resistance value of the pull-down resistor 63 is substantially larger than the resistance value of the pull-up resistor 211, the signal transferred to processor 40 has a high state. But if the resistance value of pull-down resistor 64 is substantially smaller than the resistance value of the pull-up resistor 211, the signal transferred to processor 40 has a low state.

Figure 6:
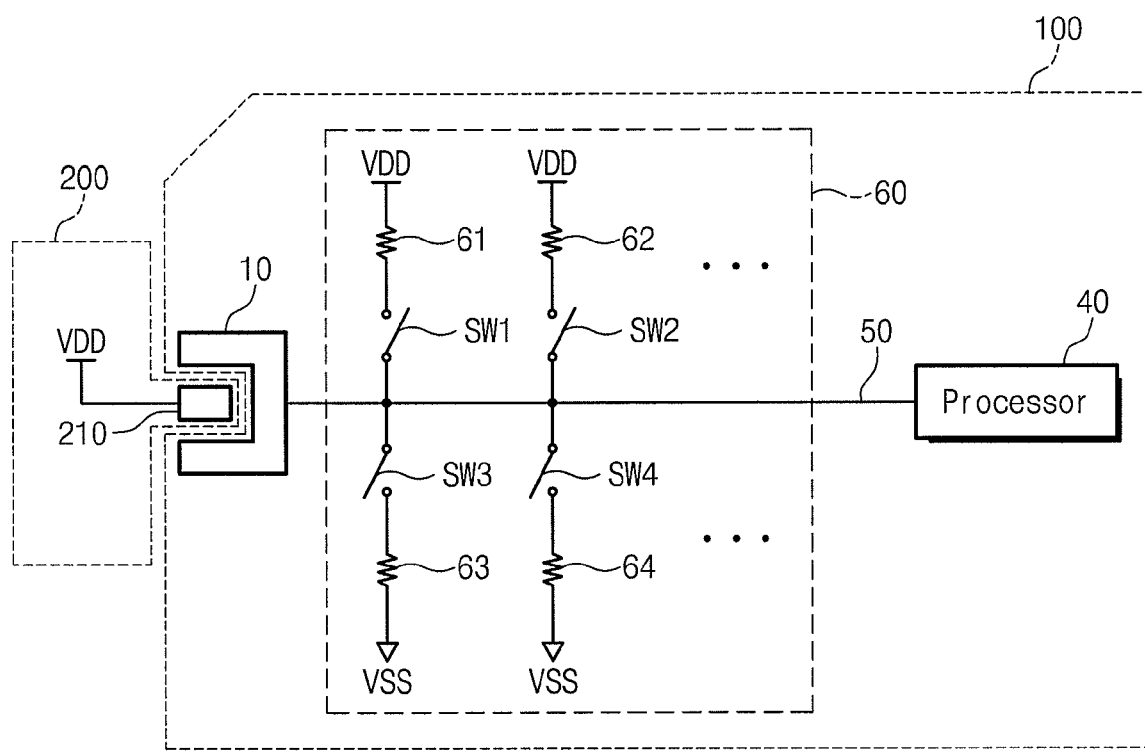

Referring to FIG. 6, the signal of the host 200 can be connected to VDD. If any resistor is connected to the Multi Function Port, the signal transferred to processor 40 has a high state.

Figure 7:
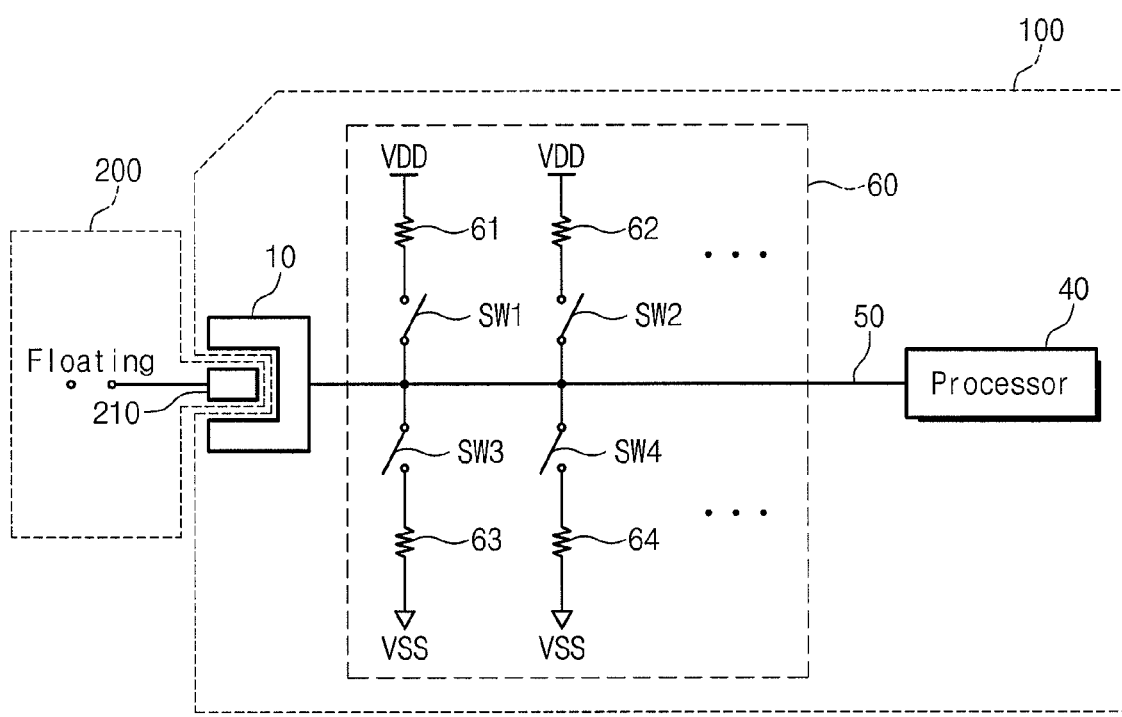

Referring to FIG. 7, the signal of the host 200 can be at a floating state. If the switch SW1 of the pull-up resistor 61 and the switch SW2 of the pull-up resistor 62 are turned on, the signal transferred to processor 40 has a high state. If the switch SW3 of the pull-down resistor 63 and the switch SW4 of the pull-down resistor 64 are turned on, the signal transferred to processor 40 has a low state.

Figure 8:
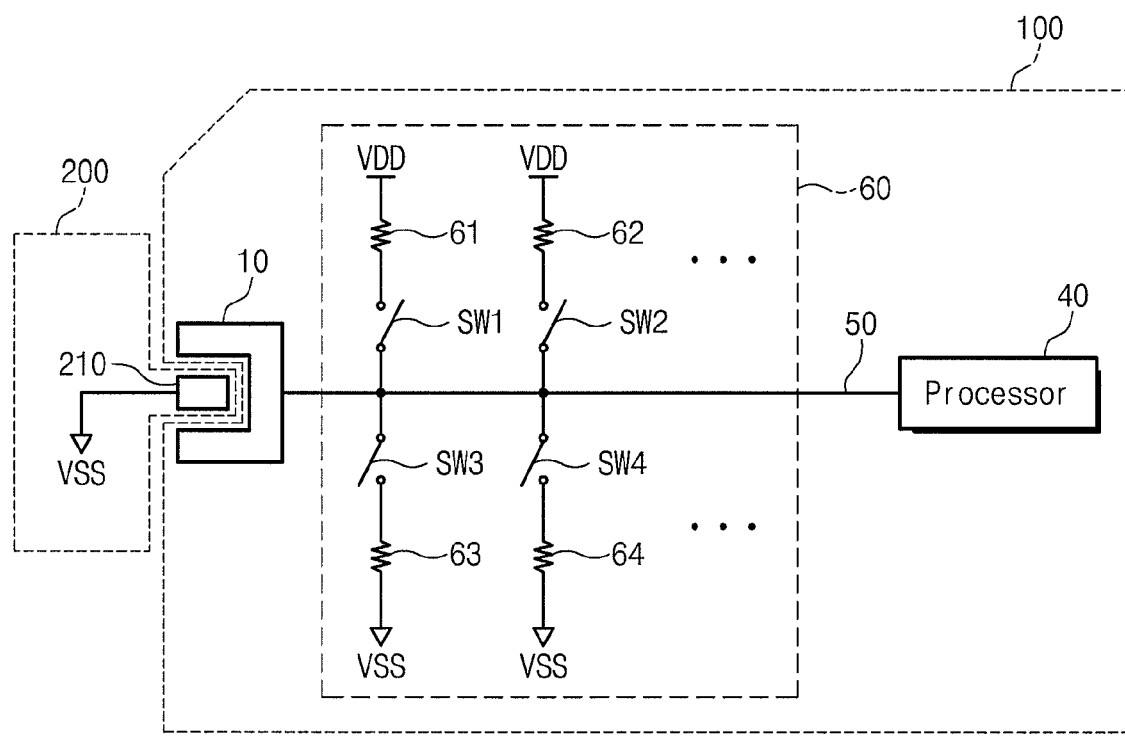

Referring to FIG. 8, the signal of the host 200 can be connected to VSS. If any resistor is connected to the Multi Function Port, the signal transferred to processor 40 has a low state.

Figure 9:
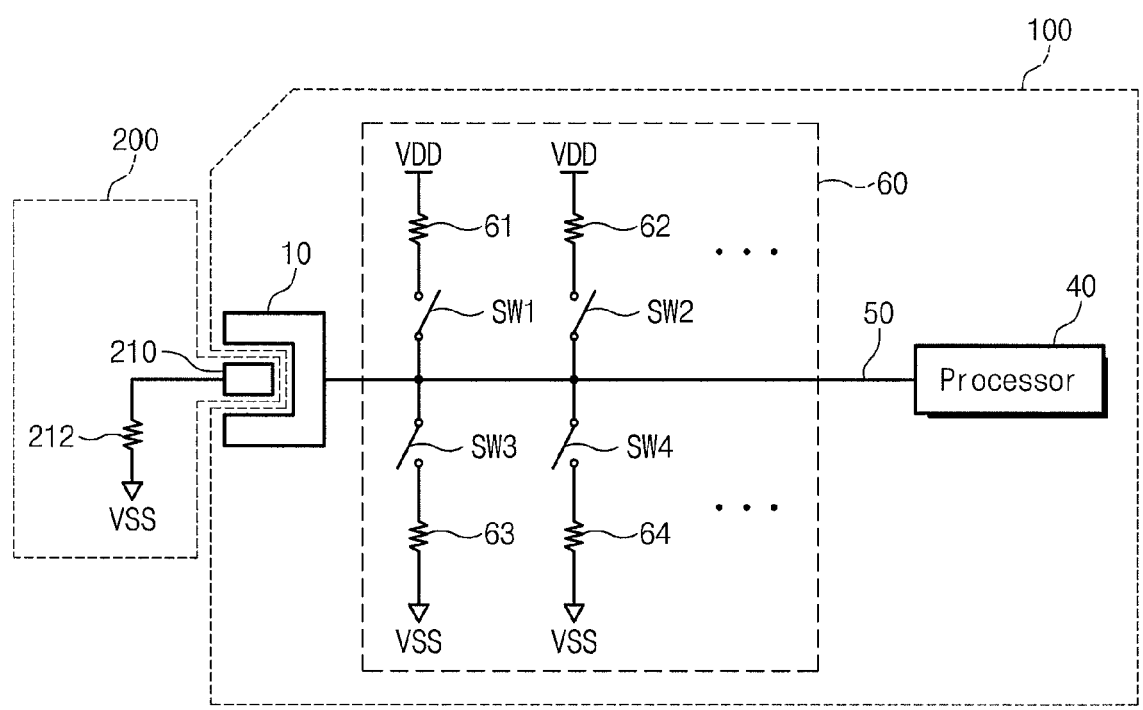

Referring to FIG. 9, if the resistance value of the pull-up resistor 61 is substantially larger than the resistance value of the pull-down resistor 212, the signal transferred to processor 40 has a low state. But if the pull-up resistor 62 is substantially smaller than the pull-down resistor 212, the signal transferred to processor 40 has a high state.

As described in FIGS. 5 to 9, the MFP can calculate or predict the value of each of pull-up resistor and pull-down resistor of the host using pull-up resistor and pull-down resistor with various values. Namely, there can be used pull-down resistor with various resistance values in the MFP.

The processor 40 can analyze the signal transferred the host 200 by synchronously or sequentially connecting pull-down resistors. If the signal transferred to the processor 40 changes from a high state to a low state or from a low state to a high state, the resistance value of the pull-down resistor becomes smaller than the resistance value of the pull-up resistor. It is possible for the MFP to estimate the value of pull-down resistor in the host 200 in the above-described manner.

FIG. 10 shows a table used to identify a protocol of host 200 using the circuit illustrated in FIGS. 5 to 9. If the host 200 supports the MMC protocol, the contact pads C4 and C8 are connected to a pull-up resistor of about 50KΩ-100KΩ. If the host 200 supports the USB protocol, the contact pads C4 and C8 are connected to a pull-down resistor of about 15KΩ.

Thus, if the host 200 supports the MMC protocol, the contact pads C4 and C8 are connected to a pull-up resistor of about 50KΩ~100KΩ.

Similarly, if the host 200 uses the USB protocol, the MFP can select a pull-up resistor having a value of about 1KΩ, from among various pull-up resisters, under the assumption that a pull-down resistor is connected to a contact pad of the host.

Referring to FIG. 5 and FIGS. 9 and 10, assuming that the pull-up resistor 211 of the contact pad 210 has a value of about 50KΩ, the pull-up resistor 61 of the IC card 100 has a value of about 10KΩ, and the pull-up resistor 61 of the IC card 100 has a value of about 10KΩ.

In the case where the switch SW1 having the pull-up resistor with a resistance value of about 1KΩ is turned on and the switch SW3 with the pull-down resistor is turned off, if the result of contact pad C4 or C8 through the MFP is at a high state, the host protocol is proven to be the USB protocol.

In the case where the switch SW1 with the pull-up resistor having a resistance value of about 1KΩ is turned off and the switch SW3 with the pull-down resistor is turned on, if the result of contact pad C4 or C8 through the MFP is at a low state, the host protocol is proven to be the MMC interface protocol.

Figure 11:
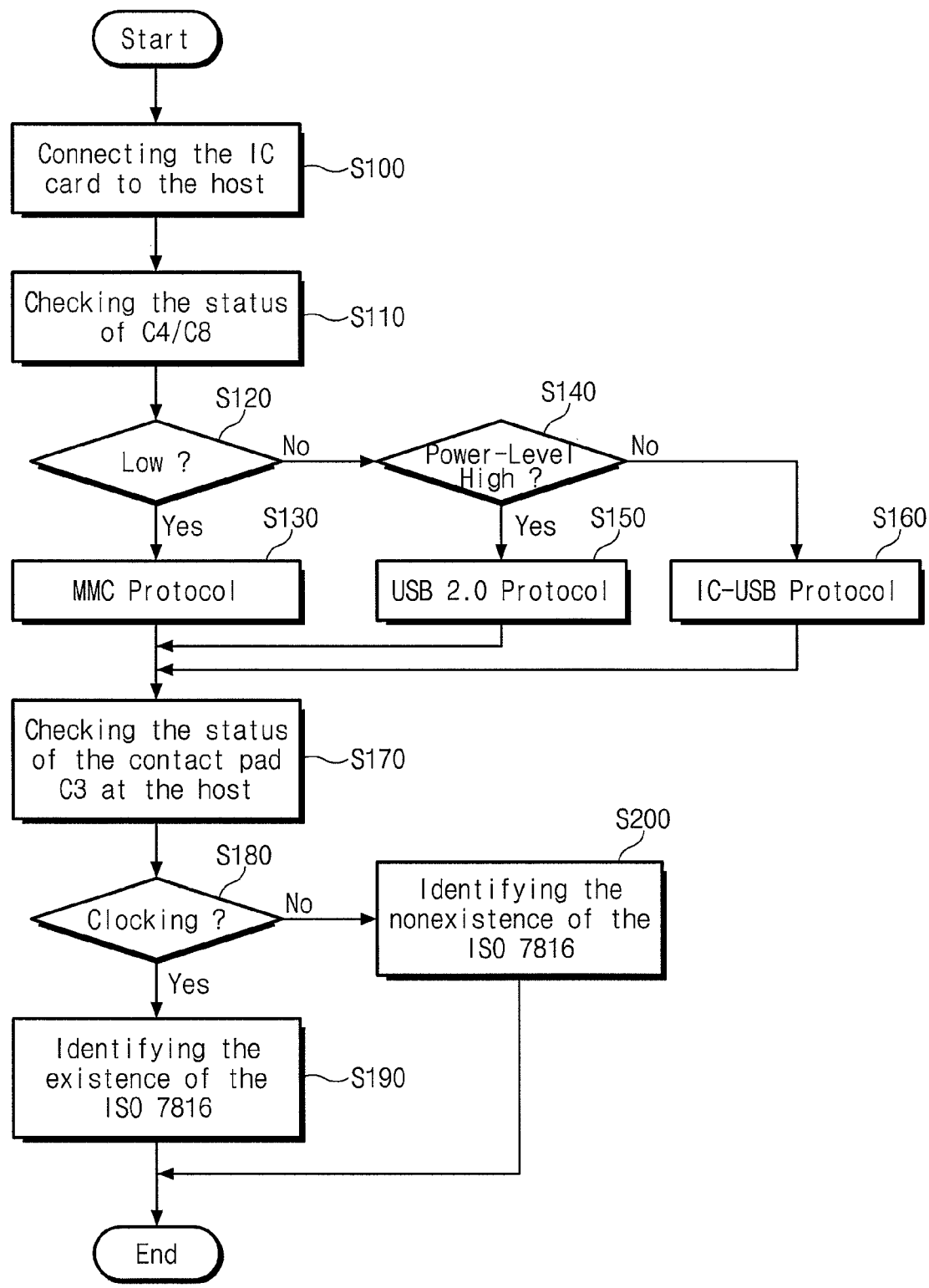
FIG. 11 is a flowchart showing an embodiment of a method for identifying a protocol of a host according to aspects of the present invention.

FIG. 11 is a flowchart showing an embodiment of a method for identifying a protocol of host according to an aspect of the present invention.

Referring to FIG. 3 and FIGS. 10 and 11, the IC card 100 is connected to the host 200 at step S100. The host interface detector 60 checks the status of contact pads of the host through the contact pad C4 or C8 at step S110. The host interface detector 60 transfers the status of the contact pads to the processor 40, which is done under the control of the processor 40 in this embodiment. The processor 40 identifies the host protocol as the MMC protocol or the USB protocol at step S120.

Namely, the processor 40 identifies whether the host has the pull-up resistor with a value of about 50KΩQ-100KΩ or the pull-down resistor with a value of about 15KΩ through the MFP in FIG. 10.

If the MFP is at a low state, the processor 40 determines the protocol to be the MMC protocol of the host 200. Otherwise, it determines the protocol to be the USB protocol of the host 200. If the host 200 supports the MMC protocol, the processor 40 activates the MMC protocol at step S130. If the host supports the USB protocol, the processor 40 identifies whether the host 200 uses the USB 2.0 or the IC-USB at step S140.

Namely, the processor 40 identifies the voltage level at step S140. If the voltage level of the host is 4.5V to 5.5V, the host protocol is determined to be the USB protocol.

The processor 40 enables the USB protocol at step S150. If the voltage level of the host is 1.65V to 1.95V, the host protocol is determined to be the IC-USB protocol. The processor 40 activates the IC-USB protocol at step S160. Additionally, if the voltage level of the host is 2.7V to 3.6V, the processor 40 distinguishes the USB protocol and the IC-USB protocol by checking the resistance value of the pull-down resistor.

Generally, a cellular phone using a SIM has basically the ISO 7816 protocol, but the next generation cellular phone does not have the ISO 7816 protocol. Therefore, it is necessary to detect whether the host supports the ISO 7816 protocol. The processor 40 checks the status of contact pad C4 at step S170. The processor 40 identifies whether the status of contact pad C3 is at a clocking state at step S180.

If the status of contact pad C3 is at a clocking state, the processor 40 determines the existence of the ISO 7816 protocol in the host 200 at step S190. Otherwise, the processor 40 determines the non-existence of the ISO 7816 protocol in the host 200 at step S200.

As described above, the IC card according to the present invention can identify the status of the host using the contact pads. Also, the IC card can identify the protocol of host and automatically support the protocol used by the host.

Additionally, the IC card can detect whether the host supports ISO 7816 or not.

The above-disclosed subject matter is to be considered illustrative, and not restrictive, and the appended claims are intended to cover all modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An operating method of an integrated circuit card including a plurality of interface protocols and being configured to enable at least one of the plurality of interface protocols, the method comprising:

receiving a status of at least one contact pad from a plurality of contact pads of the integrated circuit card connecting to a host, wherein the status of at least one contact pad is evaluated at a contact pad by sequentially connecting a plurality of pull-up resistors and a plurality of pull-down resistors having various resistance values to the contact pad;

determining a host protocol is a MMC protocol if the status of the set of contact pads is in a low state;

if the status of the set of contact pads is not in a low state, determining a voltage level of the host from the at least one contact pads;

if the voltage level of the host is high, determining the host protocol to be a USB protocol, otherwise determining the host protocol to be a IC-USB protocol;

enabling one of the plurality of interface protocols corresponding to the host protocol determined by the determining steps; and additionally determining whether the host protocol supports an ISO 7816 protocol by evaluating whether a different contact pad that is not in the at least one contact pads is in a clocking state.

2. The method according to claim 1, wherein enabling one of the plurality of interface protocols comprises controlling an interface unit of the integrated circuit card into one of a first mode and a second mode, wherein one of the plurality of interface protocols is enabled during the first mode, and wherein two of the plurality of interface protocols are enabled during the second mode.

3. The method according to claim 2, wherein one of the interface protocols enabled during the second mode is the ISO 7816 protocol, which is enabled when the host is in the clocking state.

4. The method according to claim 1, wherein enabling one of the plurality of interface protocols comprises enabling one of the interchip universal serial bus (IC-USB) protocol and the universal serial bus (USB) protocol in response to the voltage level when the voltage level is higher than a ground voltage level.

5. The method according to claim 1, wherein an interface detector of the integrated circuit card connects the plurality of pull-up resistors to the contact pad, wherein the plurality of pull-up resistors force the contact pad into a high state while a signal with a low state is transferred from an exterior to the at least one contact pad.

6. The method according to claim 1, wherein an interface detector of the integrated circuit card connects the plurality of pull-down resistors to the contact pad, wherein the plurality of pull-down resistors force the contact pad into a low state while a signal with a high state is transferred from an exterior to the at least one contact pad.

7. The method according to claim 1, wherein the status of the at least one contact pad is indicated by a status signal and when the status signal indicates a high state while the plurality of pull-up resistors and the plurality of pull-down resistors are connected to the contact pad, an universal serial bus (USB) protocol is determined.

8. The method according to claim 1, wherein the status of the at least one contact pad is indicated by a status signal and when the status signal indicates the low state while the plurality of pull-up resistors and the plurality of pull-down resistors are connected to the at least one contact pad, a multimedia card (MMC) protocol is determined.

9. The method according to claim 1, wherein the plurality of pull-up resistors force the contact pad into a high state while a signal with a low state is transferred from an exterior to the contact pad.

10. The method according to claim 1, wherein the plurality of pull-down resistors force the contact pad into a low state while a signal with a high state is transferred from an exterior to the contact pad.

11. The method according to claim 1, wherein enabling one of the plurality of interface protocols is based on a status signal and includes:
enabling the multimedia card (MMC) protocol when the status signal indicates a low state while one of the plurality of pull-up resistors and one of the plurality of pull-down resistors are connected to the contact pad.

12. The method according to claim 1, wherein enabling one of the plurality of interface protocols is based on a status signal and includes:
enabling the universal serial bus (USB) protocol when the status signal indicates a high state while one of the plurality of pull-up resistors and one of the plurality of pull-down resistors are connected to the contact pad.

13. The method according to claim 1, wherein the evaluating at the contact pad includes evaluating a voltage level of the contact pad, including:
determining a resistance value of a pull-up or pull-down resistor of the at least one contact pad of the host.

\* \* \* \* \*